United States Patent
Aarts et al.

[11] Patent Number: 6,132,304
[45] Date of Patent: Oct. 17, 2000

[54] APPARATUS FOR SEPARATING MEAT FROM BONES COMPRISING MEAT REMAINDERS

[75] Inventors: Lambertus Maria Aarts, Berghem; Johanes Jozef van der Lenden, Heerlen, both of Netherlands

[73] Assignee: Stork MPS B.V., Lichtenvoorde, Netherlands

[21] Appl. No.: 09/230,340

[22] PCT Filed: Jul. 24, 1997

[86] PCT No.: PCT/NL97/00441

§ 371 Date: Nov. 18, 1999

§ 102(e) Date: Nov. 18, 1999

[87] PCT Pub. No.: WO98/04141

PCT Pub. Date: Feb. 5, 1998

[30] Foreign Application Priority Data

Jul. 26, 1996 [NL] Netherlands ............... 1003692

[51] Int. Cl.[7] ............................................. A22C 17/04
[52] U.S. Cl. ............................................................ 452/138
[58] Field of Search ............................................. 452/138

[56] References Cited

U.S. PATENT DOCUMENTS 1,631,037  5/1927  Kochenderfer .
4,025,985  5/1977  Settle .
4,538,324  9/1985  Prosenbauer ................... 452/138
5,667,435  9/1997  Baughman et al. .............. 452/138

FOREIGN PATENT DOCUMENTS 0072365   2/1983   European Pat. Off. .
0127610   12/1984  European Pat. Off. .
0260249   3/1988   European Pat. Off. .
2901909   7/1980   Germany ...................... 452/135
7502107   8/1976   Netherlands .................. 452/135
7802947   9/1979   Netherlands .
369378    6/1963   Switzerland .
1563750   3/1980   United Kingdom .

OTHER PUBLICATIONS

SU 1 292 698 A (Odess Pressmash), Feb. 28, 1987 (Derwent Pub. XP002043721).

*Primary Examiner*—Willis Little
*Attorney, Agent, or Firm*—Banner & Witcoff, Ltd.

[57] ABSTRACT

The invention relates to an apparatus for separating meat from bones comprising meat remainders, comprising: a cylinder with a cylinder wall; a piston movable in the cylinder; infeed means for carrying bones comprising meat remainders into the cylinder; a plurality of holes arranged in the cylinder wall for passage of meat out of the cylinder placed under pressure; outfeed means for discharging bones from the cylinder; and a drive device for driving the piston, wherein the smallest passage of the holes lies between 3 mm and 12 mm and the drive device is adapted to apply a pressure in the cylinder with magnitude of between 30 bar and 120 bar.

25 Claims, 2 Drawing Sheets

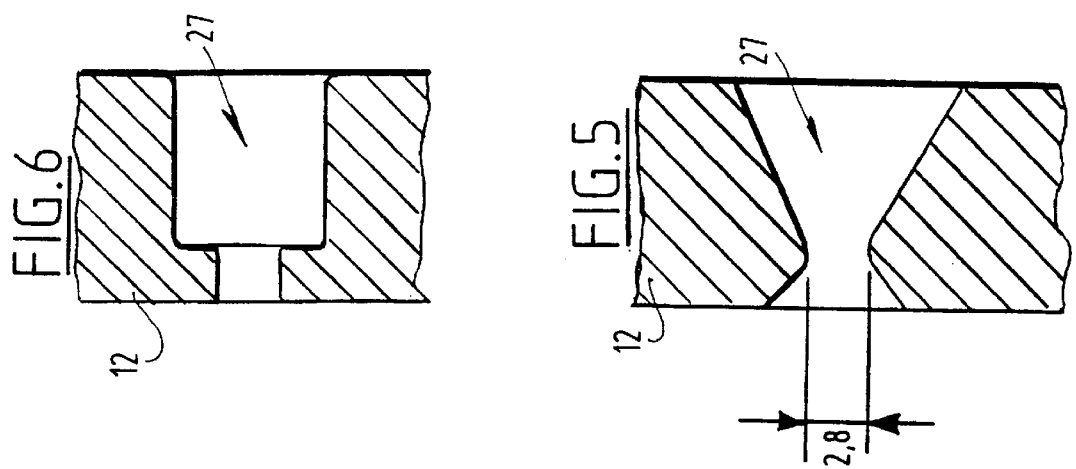
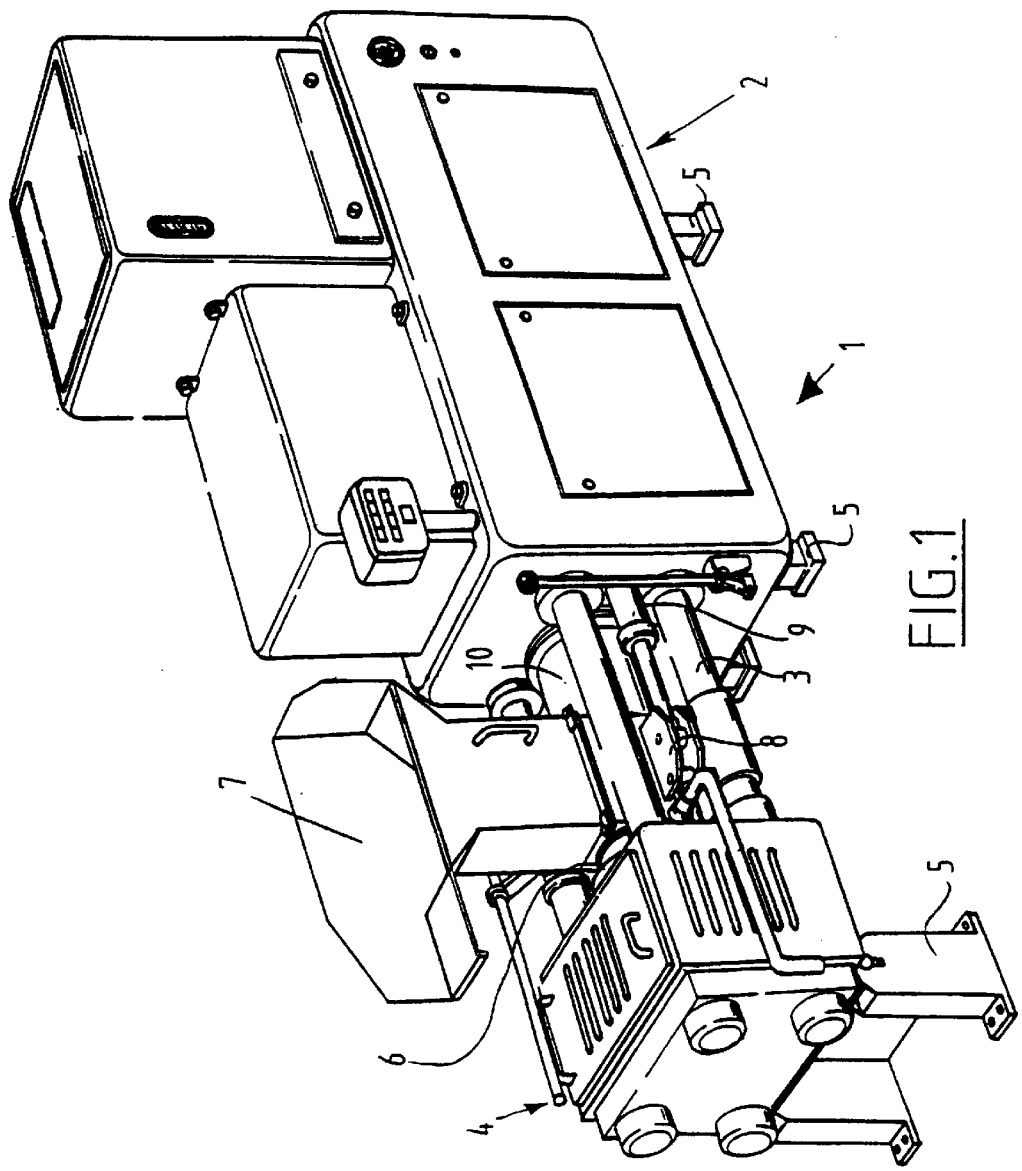

APPARATUS FOR SEPARATING MEAT FROM BONES COMPRISING MEAT REMAINDERS

The invention relates to an apparatus for separating meat from bones comprising eat remainders, comprising: a cylinder with a cylinder wall; a piston movable into the cylinder;

infeed means for carrying bones comprising meat remainders into the cylinder; a plurality of holes arranged in the cylinder wall for passage of meat out of the cylinder placed under pressure; outfeed means for discharging bones from the cylinder; and a drive device for driving the piston.

Such an apparatus is generally known.

In the use of such prior art apparatus the aim is total removal of bone particles from the meat mass. For this purpose small holes and therefore necessarily high pressures are applied.

The invention provides an apparatus wherein the smallest passage of the holes lies between 3 mm and 12 mm and wherein the rive device is adapted to apply a pressure in the cylinder with a magnitude of between 30 bar and 120 bar.

The invention is based on the insight that the total remove of bone particles from the meat mass is not optimal for every application, partly because this may have an adverse effect on the structure of the meat.

By applying larger hole restrictions the required pressure can be reduced.

While the quantity of bone material in the meat mass increases as a result, on the other hand the structure of the meat is largely preserved, this in contrast to the prior art, wherein the structure is for the most part lost due to the high pressure. In addition, the amount of marrow in the meat mass decreases considerably. Due to the improved structure relative to the prior art and the decreased amount of marrow in the meat mass obtained with the invention, this meat mass is more suitable for further processing, such as a second filtration step which has no further adverse effect on the structure of the meat but which does cause a decrease in the amount of bone, or other process wherein the bone particles are reduced to an acceptable size or quantity.

A great advantage of the apparatus according to the invention is that the meat is suitable for new applications such as processing to minced meat or sausage.

Owing to the lower pressures the apparatus can moreover be dimensioned more simply, which reduces the cost price thereof.

Furthermore, due to the comparatively low pressure, the bone structure still remains sufficiently open to also allow meat in the middle of the cylinder the space to move to the outside of the cylinder, which was not always the case in prior art apparatus; owing to the high pressures the structure particularly of portions of the bone mass adjacently of the cylinder wall became so dense that it became impassable for the meat mass.

Another advantage lies in the fact that as a consequence of the comparatively low pressure the temperature during the process hardly increases, which is extremely important for reasons of hygiene.

It is pointed out herein that the outfeed means may take any random form, even that of a separate tool or that of the piston which ejects the bone remnants from the cylinder.

The minimum passage of the outfeed channels preferably amounts to between 6 mm and 10 mm and according to a particularly attractive preferred embodiment this passage is 8 mm.

According to another preferred embodiment the drive device is adapted to cause the piston to move at a speed of at least 20 mm/s during the pressure increase.

According to yet another preferred embodiment the drive device is adapted to build up the maximum pressure within 4 s.

According to a particularly attractive embodiment the drive device is adapted after developing the required pressure to maintain this pressure for a maximum of 1 s before decreasing the pressure, or, according to another embodiment the drive device is adapted after developing the required pressure to decrease the pressure immediately.

All these steps result in a process such that the marrow content in the meat mass is reduced. This results in an improved quality.

According to yet another preferred embodiment the outfeed channels are widened in the flow direction toward the smallest passage. This means that only a single restriction is incorporated in the outfeed channel so that the meat only has to pass through such a restriction once and the problems of excessive deformation of the meat and separation thereof caused by the restriction are limited to a minimum. The danger of blockage is moreover smaller and such apertures are easier to clean.

According to another preferred embodiment, wherein a large number of outfeed channels is arranged in the cylinder jacket, the cylinder jacket is supported only at its end. This results in a simpler construction wherein such a simple construction is not possible in such apparatus operating at a high pressure because they require support at more positions in respect of the high pressure.

The present invention furthermore relates to an apparatus for separating meat from bones comprising meat remainders, comprising:

a cylinder with a cylinder jacket;

an end wall;

a piston movable into the cylinder;

infeed means for carrying bones comprising meat remainders into the cylinder;

a plurality of holes arranged in the cylinder jacket or in the end wall for passage of meat out of the cylinder placed under pressure;

a piston drive device for driving the piston; and a cylinder jacket drive device for driving the cylinder jacket in the direction of movement of the piston independently of the piston.

Such an apparatus is known from U.S. Pat. No. 4,025,985.

In this prior art apparatus the process cycle is rather complicated and time-consuming.

The object of the present invention is to provide an apparatus wherein the process cycle can be simplified.

This object is achieved in that the infeed means comprise an opening in the cylinder wall. This results in a simple construction.

According to a preferred embodiment the infeed means are adapted to supply the bones comprising meat remainders on the piston side of the cylinder jacket.

According to another preferred embodiment the direction of movement of the piston is substantially horizontal.

Because the direction of movement of the piston is horizontal, use can be made during infeed and outfeed of the force of gravity so that the infeed and outfeed means can take a simple form. Although it is possible in principle to cause infeed and outfeed to take place on the same end side of the cylinder jacket, this causes problems in respect of dropping through the apparatus during loading. In order to prevent this, receiving means would have to be arranged and means would have to be arranged for moving the bones comprising meat remainders into the cylinder.

According to the preferred embodiment this problem is obviated by causing infeed and outfeed to take place on different sides of the cylinder jacket.

According to yet another preferred embodiment the length of the infeed hopper in the direction of movement of the piston is greater than the diameter of the piston. The required degree of filling of the cylinder can hereby be achieved without formation of bridges leading to blockages.

Experience has further shown that after the pressure has been developed in the cylinder it is attractive to maintain the maximum pressure for only a short time, for instance only 1 s. This results in a yield of meat of high quality.

Finally, the invention relates to a method for separating meat from bones comprising meat remainders, comprising the following steps of:

carrying bones comprising meat remainders into a cylinder with a cylinder wall;

generating a pressure in the cylinder by means of a piston movable into the cylinder and drive device connected thereto so that the meat mass is pressed out through apertures arranged in the cylinder wall; and discharging the bones from the cylinder, wherein the meat is pressed through holes with a smallest passage of between 3 mm and 12 mm with a pressure of a magnitude between 30 bar and 120 bar.

Other preferred embodiments are to be found in the remaining sub-claims.

The invention will be elucidated hereinbelow with reference to the annexed drawings, in which:

FIG. 1 shows a perspective view of an apparatus according to the present invention;

FIG. 5 shows a sectional view of a first embodiment of a filter aperture; and

FIG. 6 shows a second embodiment of a filter aperture.

Figure 2:
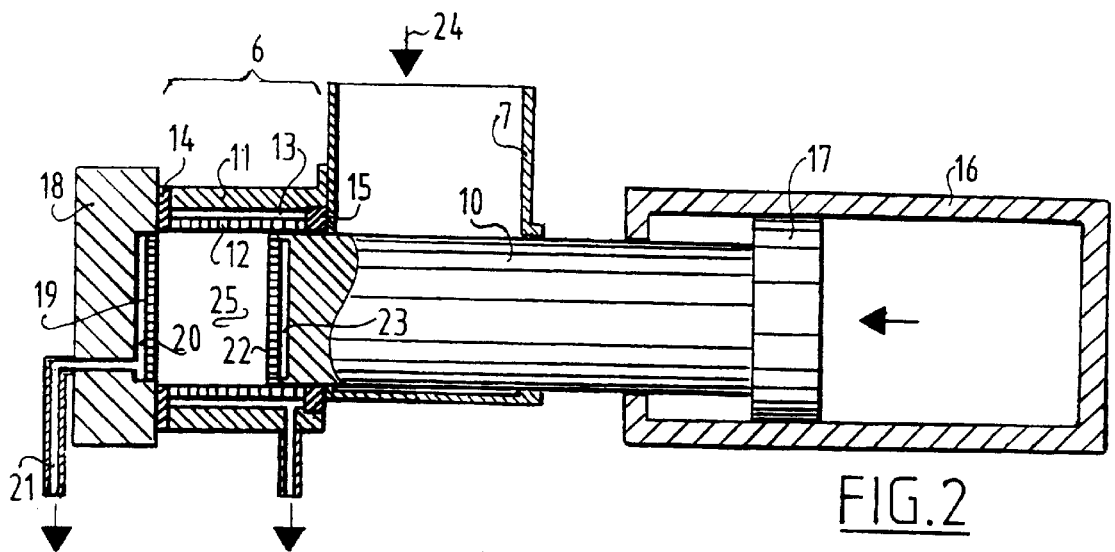
FIG. 2 shows a schematic sectional view of a part of an apparatus according to the invention during the pressing process.

FIG. 1 shows a machine according to the present invention. Such a machine 1 is formed by a casing 2 in which diverse drive units are arranged. Machine housing 1 is connected by means of cylinders 3 to an auxiliary machine housing 4 in which other equipment is arranged. Both machine housings 2, 4 are anchored to the ground by means of legs 5.

In addition, a sleeve 6 is arranged at the position of cylinders 3, the construction of which sleeve will be discussed with reference to FIGS. 2–4. Arranged on sleeve 6 is an infeed hopper 7, the length of which in the direction of movement of the piston is greater than the diameter of the piston, while sleeve 6 together with infeed hopper 7 is movable in horizontal direction by means of ears 8 which are fixed to sleeve 6 and which are drivable by means of a linear drive device, 9, for instance an hydraulic cylinder. Movable into the inside of sleeve 6 is a pressure piston 10 which is drivable by means of a drive device arranged in housing 2.

Figure 3:
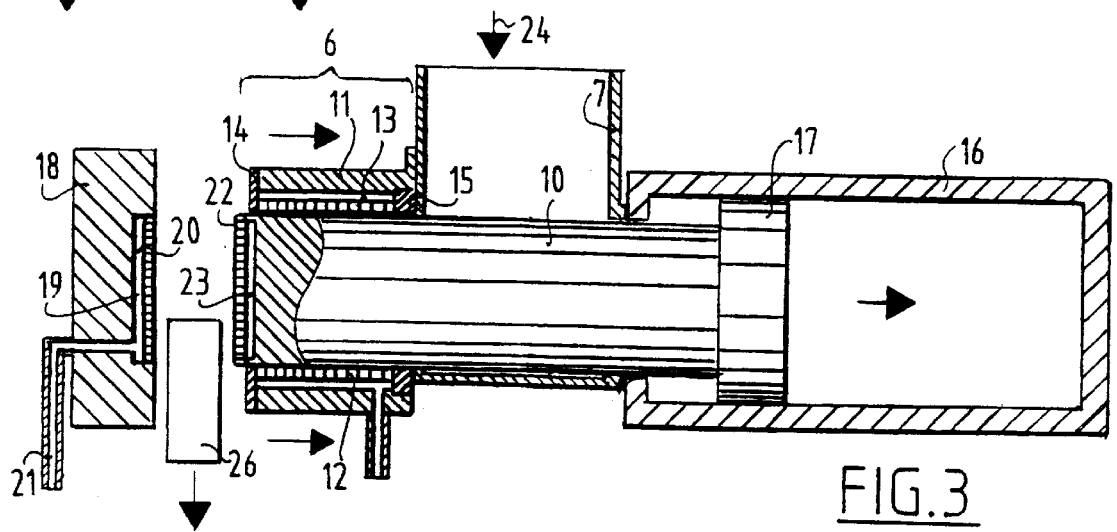
FIG. 3 shows a sectional view corresponding with FIG. 2 during ejection of the bone remnants.
Figure 4:
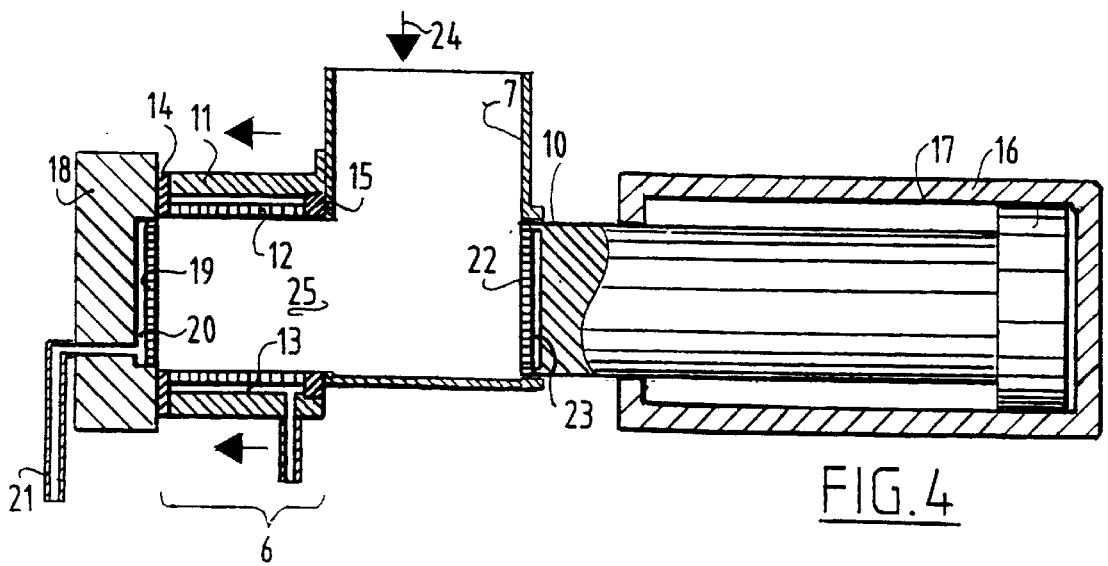
FIG. 4 shows a sectional view corresponding with FIGS. 2 and 3 during preparation of the following stroke.

The construction of sleeve 6 will now be elucidated in more detail with reference to FIGS. 2, 3 and 4.

As can be seen in FIG. 2, sleeve 6 is formed by an outer sleeve 11 extending over a part of the axial length of the sleeve and a filter sleeve 12 arranged concentrically inside the outer sleeve. The outer diameter of filter sleeve 12 is so much smaller than the internal diameter of the outer sleeve that an annular channel 13 is created therebetween. On the side of the auxiliary machine housing 4 the outer sleeve 11 and filter sleeve 12 are mutually connected by a ring 14 and on the other side they are mutually connected by a ring 15. Fixed to ring 15 is infeed hopper 7 which is provided on the side of machine housing 2 with an annular opening. The diameter of this annular opening is exactly equal to the internal diameter of filter sleeve 12.

In addition, as already stated with reference to FIG. 1, a piston 10 with the same diameter as the internal diameter of filter sleeve 12 can be moved into sleeve 6. This piston 10 is herein drivable by means of a drive cylinder 16 which is accommodated in housing 2. By means of an auxiliary drive piston 17 with a larger surface area fixed to this piston 10 the pressures required to drive piston 10 are reduced in proportion to the change in surface area. Fixedly arranged on the side of auxiliary housing 4 is a pressure plate 18 which is provided on its side facing toward the sleeve 6 with a filter wall 19. A channel 20 is recessed between filter wall 19 and pressure wall 18. Channel 20 debouches in an outfeed channel 21, as does channel 13.

In respect of freedom of movement it is noted that the piston 10 is of course movable in horizontal direction and that sleeve 6, i.e. outer sleeve 11, infeed hopped 7 and the components fixed thereto, are likewise movable in horizontal direction.

Where the construction is concerned it is noted that all parts coming into contact with the material for processing are manufactured from stainless steel. It is further pointed out that the pressure side of piston 10 is provided with a filter wall 22 behind which extends a channel 23 which communicates with filter 12 in the effective position of piston 10.

The drive device, in particular cylinder 16, piston 17 and the hydraulic pump connected thereto but not shown in the drawings, and the control means applied therein which are likewise not shown in the drawings, are adapted to control the hydraulic pressure inside cylinder 16 such that piston 10 can generate a pressure of between 50 and 100 bar, in particular about 70 bar, on the compression chamber enclosed by sleeve 6 and pressure wall 18. It will be apparent that this pressure can be adjusted by means of the control equipment arranged therein.

It is further pointed out that filter sleeve 12, filter walls 19 and 22 are each provided with substantially cylindrical apertures, the diameter of which amounts to roughly 8 mm. It is of course possible to use apertures which other diameters, for instance 3.0 mm, 4.0 mm, 5.0 mm, 6.0 mm, 10 mm, 12 mm and so on.

On the other hand it is pointed out that it is possible to use holes with a form which is not purely cylindrical but which, in contrast thereto, is diabolo-shaped as shown in cross-section with 27 in FIG. 5. This results in a single restriction, which has a good effect on the quality of the finally obtained meat since in such a situation the least possible separation occurs and the temperature increase is as small as possible.

It is moreover possible, as shown in FIG. 6, to employ a single cylindrical restriction.

It is furthermore possible to make use of holes with a non-round, for instance oval, rectangular of polygonal form.

According to yet another embodiment only the part of the jacket in the vicinity of the end wall of the cylinder is provided with holes. The holes are thus arranged only in that part of the jacket which is effective at the nominal pressure.

The method of the apparatus according to the present invention will now be elucidated.

Starting from the situation shown in FIG. 4, material is first supplied from the fed funnel. This material is formed by trimmed bones, i.e. bones from which the meat easy to remove has been removed by means of a mechanical deboning device or by hand. These bones may come from large mammals but may equally originate from small mammals such as game or poultry.

A small amount of meat is still attached to these bones which is worth recovering with the apparatus according to the present invention, on the one hand due to the hereby obtained meat and on the other because the remaining bones are thus cleaner and can be better processed, for instance to gelatin, in a subsequent process.

In the manner indicated by arrow 24, the mass is fed into the compression space 25. The piston 10 is subsequently urged inside, whereafter, as soon as the piston edge has passed over ring 15, pressure is developed inside the thus formed compression space 25. Such a situation is shown in FIG. 2. Control of the pressure herein takes place such that the pressure is built up inside compression space 25 to about 70 bar, wherein, as stated above, this value is subject to adjustment, and the thus formed pressure is maintained for a short period of about 0.1 second.

As a result of this high pressure there occurs a certain fluidization of the bones and the meat remainders attached thereto, wherein through mutual friction of the bones the meat remainders are released from the bones and the thus obtained meat mass passes to the outside through the filter walls. It is possible for bone particles to exit to the outside through the relatively large apertures. These bone particles can be removed by using secondary filtering methods.

The pressure is further so low that no splintering of the bones can occur.

The pressure is then reduced again, wherein, as soon as the pressure within the compression space has once again reached ambient pressure, sleeve 6 is initially displaced together with the piston to bring about release of the bone mass from filter wall 19. The piston is subsequently moved at a higher speed than the sleeve for a short time duration so that the bone mass is released from the piston end wall.

The piston is then moved at a lower speed than the sleeve to release the bone mass from sleeve 6 and remove it from the space enclosed by sleeve 6, so that the bone mass can drop downward.

The sleeve 6 then moves back to its original position, as does piston 10, so that the starting position is obtained as shown in FIG. 4 and the process can be repeated.

It will be apparent that diverse modifications can be arranged herein without deviating from the invention.

What is claimed is:

1. Apparatus for separating meat from bones comprising meat remainders, comprising:
    a cylinder with a cylinder wall;
    a piston movable into the cylinder infeed means for carrying bones comprising meat remainders into the cylinder;
    a plurality of holes arranged in the cylinder wall for passage of meat out of the cylinder placed under pressure;
    outfeed means for discharging bones from the cylinder; and
    a drive device for driving the piston characterized in that the smallest maximum diameter of the holes lies between 3 mm and 12 mm; and
    the drive device is adapted to apply a pressure in the cylinder with a magnitude of between 30 and 120 bar.

2. Apparatus as claimed in claim 1 wherein the holes have a smallest maximum diameter of between 6 mm and 10 mm.

3. Apparatus as claimed in claim 1 wherein the drive device is adapted to generate a pressure in the cylinder of between 50 bar and 90 bar.

4. Apparatus as claimed in claim 1 wherein the drive device is adapted to cause the piston to move at a speed of at least 20 mm/s during the pressure increase.

5. Apparatus as claimed in claim 1 wherein the drive device is adapted to develop the maximum pressure within 4 s.

6. Apparatus as claimed in claim 1 wherein the control device is adapted after developing the required pressure in the cylinder to maintain the required pressure for a maximum of 1 s before decreasing the pressure.

7. Apparatus as claimed in claim 6 wherein the drive device is adapted after developing the maximum pressure to decrease the pressure immediately.

8. Apparatus as claimed in claim 1 wherein the internal diameter of the cylinder jacket lies between 150 mm and 350 mm.

9. Apparatus as claimed in claim 1 wherein the holes are widened in the flow direction after the minimal diameter.

10. Apparatus as claimed in claim 1 wherein the cylinder jacket is supported only at its ends.

11. Apparatus as claimed in claim 1 wherein the holes are arranged mainly in that part of the cylinder jacket adjoining the part of the cylinder in which the highest pressure force is applied.

12. Apparatus as claimed in claim 1 wherein:
    the cylinder comprises a cylinder jacket and an end wall;
    that the apparatus comprises a cylinder jacket drive device for driving the cylinder jacket in the direction of movement of the piston independently of the piston; and
    that the infeed means comprise an opening in the cylinder.

13. Apparatus as claimed in claim 12 the infeed means are adapted to supply the bones comprising meat remainders on the piston side of the cylinder jacket.

14. Apparatus as claimed in claim 12 wherein the direction of movement of the piston is substantially horizontal.

15. Apparatus as claimed in claim 12 wherein the cylinder end wall is provided with a plurality of holes for passage of the meat out of the cylinder placed under pressure.

16. Apparatus as claimed in claim 12 wherein the length of the opening in the direction of movement of the piston is greater than the diameter of the piston.

17. Apparatus as claimed in claim 16 wherein the infeed means comprise an infeed hopper with a dispensing device connecting onto the opening.

18. Apparatus as claimed in claim 12 further comprising a control device for successively:
    causing the cylinder jacket to move to the end wall;
    driving the piston with the piston drive device to the required pressure; and
    causing the cylinder jacket and the piston to move back so that the compressed bone mass is removed from the cylinder space, wherein the control device is adapted to cause the cylinder jacket to move more rapidly than the piston during at least a part of the return stroke of the piston.

19. Apparatus as claimed in claim 12 wherein:
    the control device is adapted to cause the piston to move more rapidly than the cylinder jacket during at least a part of the return stroke of the piston.

20. Method for separating meat from bones comprising meat remainders, comprising the following steps of:

carrying bones comprising meat remainders into a cylinder with a cylinder wall;

generating a pressure in the cylinder by means of a piston movable into the cylinder and a drive device connected thereto so that the meat mass is pressed out through apertures arranged in the cylinder wall; and discharging the bones from the cylinder, wherein the meat is pressed through holes with a smallest diameter of between 3 mm and 12 mm with a pressure of a magnitude between 30 bar and 120 bar.

21. Method as claimed in claim 20 wherein the meat is pressed through holes with a smallest diameter of between 6 mm and 10 mm.

22. Method as claimed in claim 20 wherein the meat is pressed with a pressure between 50 bar and 90 bar.

23. Method as claimed in claim 20 wherein the bones comprising meat remainders are carried into the cylinder via an opening arranged in the wall of the cylinder.

24. Method as claimed in claim 23 wherein the bones are carried out of the cylinder by causing the cylinder jacket to move more rapidly in axial direction than the piston during at least a part of the return stroke of the piston.

25. Method as claimed in claim 23 wherein the piston moves more rapidly than the cylinder jacket during at least a part of the return stroke of the piston.

* * * * *